(12) United States Patent
Berenbrink et al.

(10) Patent No.: US 7,472,540 B2
(45) Date of Patent: Jan. 6, 2009

(54) METHOD AND DEVICE FOR COMPENSATING VARIATIONS IN FUEL COMPOSITION IN A GAS TURBINE SYSTEM

(75) Inventors: Peter Berenbrink, Bochum (DE); Malte Blomeyer, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 167 days.

(21) Appl. No.: 10/575,516

(22) PCT Filed: Oct. 11, 2004

(86) PCT No.: PCT/EP2004/011382

§ 371 (c)(1),
(2), (4) Date: Apr. 13, 2006

(87) PCT Pub. No.: WO2005/038214

PCT Pub. Date: Apr. 28, 2005

(65) Prior Publication Data

US 2007/0119178 A1 May 31, 2007

(30) Foreign Application Priority Data

Oct. 13, 2003 (EP) .................................. 03023212

(51) Int. Cl.
*F02C 9/26* (2006.01)
(52) U.S. Cl. ...................... 60/39.281; 60/734
(58) Field of Classification Search ................... 60/772, 60/734, 39.281
See application file for complete search history.

(56) References Cited

U.S. PATENT DOCUMENTS

| 4,369,803 | A |  | 1/1983 | Furr | |
| 4,766,721 | A | * | 8/1988 | Iizuka et al. | 60/39.23 |
| 5,281,129 | A | * | 1/1994 | Urushidani et al. | 431/12 |
| 5,319,931 | A | * | 6/1994 | Beebe et al. | 60/773 |
| 5,327,718 | A | * | 7/1994 | Iwata et al. | 60/773 |
| 5,661,969 | A | * | 9/1997 | Beebe et al. | 60/39.281 |
| 6,082,092 | A |  | 7/2000 | Vandervort | |
| 2001/0023578 | A1 |  | 9/2001 | Braun et al. | |
| 2005/0028530 | A1 | * | 2/2005 | Doebbeling et al. | 60/773 |

FOREIGN PATENT DOCUMENTS

| DE | 1 097 214 | 1/1961 |
| DE | 199 21 981 A1 | 11/2000 |
| EP | 0 501 313 A1 | 9/1992 |
| EP | 1 331 448 A2 | 7/2003 |
| WO | WO 91/06809 A1 | 5/1991 |
| WO | WO 03/062618 A1 | 7/2003 |

* cited by examiner

Primary Examiner—Ted Kim

(57) ABSTRACT

The invention relates to a method for compensating variations in fuel composition in a gas turbine system consisting of at least two parallel-operated burner stages, wherein the fuel supply to at least two of the burner stages is adjusted in response to variations in fuel composition, wherein the fuel split between the burner stages, i.e. the relative increase in speed of the fuel supplied to the burner stages, is adjusted to a target value or maintained at a target value during adjustment of the fuel supply. The target value can, for example be a constant or a function of one or several variables. More particularly, the gas turbine system can comprise a pilot burner stage and a main burner stage. When the fuel supply is adjusted, the fuel split between the pilot burner stage and the main burner stage is adjusted to a target value or maintained at a target value.

7 Claims, 1 Drawing Sheet

METHOD AND DEVICE FOR COMPENSATING VARIATIONS IN FUEL COMPOSITION IN A GAS TURBINE SYSTEM

CROSS REFERENCE TO RELATED APPLICATIONS

This application is the US National Stage of International Application No. PCT/EP2004/011382, filed Oct. 11, 2004 and claims the benefit thereof. The International Application claims the benefits of European application No. EP03023212.8 filed Oct. 13, 2003, both applications are incorporated by reference herein in their entirety.

FIELD OF THE INVENTION

The invention relates to a method for compensating variations in the fuel composition in a gas turbine system, particularly in a gas turbine system consisting of at least two burner stages to be operated in parallel, and more particularly in a gas turbine system consisting of a pilot burner stage and a main burner stage.

BACKGROUND OF THE INVENTION

A gas turbine system includes in the simplest case, a compressor, a combustion chamber as well as a turbine. In the compressor, a compression of sucked-in air takes place, to which a fuel is subsequently added. In the combustion chamber, combustion of the mixture is undertaken, with the combustion gases being fed to the turbine, by which energy is drawn from the combustion gases and converted into mechanical energy.

These days, gas turbine systems are equipped with multi-stage combustion chambers, consisting of a plurality of burner stages to be operated in parallel, which depending on the utilization of the gas turbine systems, can be operated either individually or jointly. Typically, the parallel burner stages can comprise a main burner stage and a pilot burner stage, in which case the flame of the pilot burner stage should more particularly stabilize the flame of the main burner stage.

During the stationary operation of a gas turbine system, the released quantity of heat should, in essence, be kept constant. However, variations in the fuel quality lead to variations in the released quantity of heat and thereby in the efficiency of the system. That is why, in order to compensate for variations in the fuel composition, gas turbine systems have a control device, by means of which the efficiency or the exhaust gas temperature is likewise kept constant in relation to the quantity of heat released.

In general, the efficiency or the exhaust gas temperature is kept constant by adjusting the supply of fuel to the main burner stage by means of a regulator, which determines the fuel quantity.

However, this procedure can cause increased emissions or combustion fluctuations.

SUMMARY OF THE INVENTION

It is therefore the object of this invention to make available a method for compensating variations in the fuel composition in a gas turbine system, a control device for adjusting the supply of fuel to a gas turbine system as well as a gas turbine system, in which increased emissions or combustion fluctuations when compensating the variations in the fuel composition can be avoided more effectively.

This object of the invention is achieved by a method, a control device and a gas turbine system according to the claims. Advantageous embodiments and further developments emerge from the dependent claims.

The invention relates to a method for compensating variations in the fuel composition in a gas turbine system consisting of at least two burner stages to be operated in parallel, in which the supply of fuel to at least two of the burner stages is adjusted in response to variations in the fuel composition, in which the fuel split between the burner stages, i.e. the relative increase in speed of the fuel supplied to the burner stages, is adjusted to a target value or kept constant at a target value during the adjustment of the supply of fuel. The target value can, for example, be a constant or a function of one variable or a plurality of variables. More particularly, the gas turbine system can comprise a pilot burner stage and a main burner stage. When the supply of fuel is adjusted, the fuel split between the pilot burner stage and the main burner stage is adjusted to a target value or kept constant at a target value.

The invention is based on the following knowledge:

As mentioned above, it is clear that the compensation of variations in the fuel composition by adjusting the supply of fuel to the main burner stage by means of a regulator, which determines the fuel quantity, in the worst-case scenario, leads to an increase in emissions or to combustion fluctuations. The cause of this is that the fuel split is changed when adjusting the supply of fuel to the main burner stage. For instance, changing the fuel split between a pilot burner stage and a main burner stage can adversely affect the stability of the main burner flame, which is usually the flame of a lean air-fuel mixture. The lean air-fuel mixture, within the framework of the so-called dry denitrogenation serves to keep the emission values of the system low. In this way, a low stability of the flame of the lean air-fuel mixture has an adverse effect on the emission values of the system. By keeping the fuel split constant at a target value or adjusting the fuel split to a suitable new target value, on the other hand, the adverse effects on the stability of the main burner flame can be avoided or at least reduced so that the above-mentioned disadvantages can be avoided or reduced.

The supply of fuel to one burner is adjusted by means of a fuel control valve, which represents a throttle. The valves are operated in the range of a critical drop in pressure, i.e. the flow of fuel through the valve is proportional to the fuel pressure on the inlet side and to the valve lift. In this case, the quantity of heat released in the combustion chamber is then adjusted by the drop in pressure in the valve, in which the released quantity of heat is connected with the drop in pressure through the Wobbe index.

So long as only one combustion stage is adjusted, as is customary in the prior art, the characteristic values of the regulator are adjusted for a specific standard fuel composition, i.e. a specific Wobbe index, in which a specific bandwidth of the deviation of the fuel composition from the standard is allowed. However, the deviation from the standard can, in this case, be treated as a disturbance variable of the control system, which can be brought under control by keeping the efficiency or the exhaust gas temperature of the gas turbine system constant. As a result, knowledge of the current Wobbe index of the fuel is not required in the prior art for adjusting the supply of fuel.

However, knowledge of the actual Wobbe index also allows the adaptation of the fuel split to a new, adapted target value or the keeping constant of the fuel split at the current target value, while the actual Wobbe index of the fuel is taken as the basis for the characteristic values of the regulator for adjusting the drop in pressure in the control valves of the individual burner stages.

Therefore, in an advantageous embodiment of the method, in order to adjust the supply of fuel to at least two of the burner stages, a fuel control valve and the associated characteristic values of the regulator are used, and the characteristic values of the regulator are updated as follows in response to variations in the fuel composition:

carrying out a real time analysis of the fuel composition,
determining the current Wobbe index of the fuel on the basis of the result of the analysis, and
updating the characteristic values of the regulator for the control valves on the basis of the Wobbe index determined.

On the basis of the current Wobbe index of the fuel, it is possible in this embodiment to adjust the specific drop in pressure to the individual control valves for each fuel composition in such a way that the fuel split is adjusted to a new target value or kept constant at the current target value. More particularly, the embodiment of the method according to the invention described above ensures that the characteristic values of the regulator are always based on the current Wobbe index of the fuel, even in cases when the fuel composition has been subjected to sudden or large changes.

A control device suitable for carrying out the method according to the invention for adjusting the supply of fuel in a gas turbine system consisting of at least two burner stages to be operated in parallel and a fuel supply control, which for the burner stages in each case has a fuel control valve and the associated characteristic values of the regulator, comprises the following:

an analyzer for analyzing the fuel composition in real time,
a computing unit for calculating the current Wobbe index of the fuel, as well as
an updating unit for updating at least the characteristic values of the regulator of two control valves associated to the different burner stages on the basis of the determined Wobbe index.

According to the invention, a gas turbine system by means of which increased emissions or combustion fluctuations when changing the fuel composition can be avoided or at least reduced, comprises at least two burner stages to be operated in parallel and a control device according to the invention. More particularly, the burner stages comprise a pilot burner stage and a main burner stage, whereby the updating unit of the control device for updating the characteristic values of the regulator of the main burner stage control valves as well as the pilot burner stage are embodied on the basis of the determined Wobbe index.

In an advantageous embodiment of the gas turbine system according to the invention, said system comprises a fuel line, through which a fuel flow passes and a branching point on the fuel line for branching off a part of the fuel and for introducing the branched off fuel as an analysis sample flow into a branch line, which feeds the analysis sample flow to the analyzer. In this case, the branching point is arranged in such a way that the time, which is required by the fuel flow in order to cover the path from the branching point up to the fuel control valves, is long enough, so that the analysis sample flow can cover the stretch of way up to the analyzer, and the analyzer can analyze the fuel composition, the computing unit can calculate the Wobbe index, the updating unit can update the characteristic values of the regulator and the control device can adjust the fuel control valves before the fuel flow reaches the fuel control valves.

With the embodiment of the gas turbine system described above, it is ensured that the Wobbe index of the fuel flow, which has just arrived at the valves, can always be taken as the basis for the characteristic values of the regulator, even if the fuel composition fluctuates on a very short time scale.

BRIEF DESCRIPTION OF THE DRAWINGS

Further features, characteristics and advantages of the invention will emerge from the description, which follows of embodiments, and from the accompanying drawing.

DETAILED DESCRIPTION OF THE INVENTION

Figure 1:
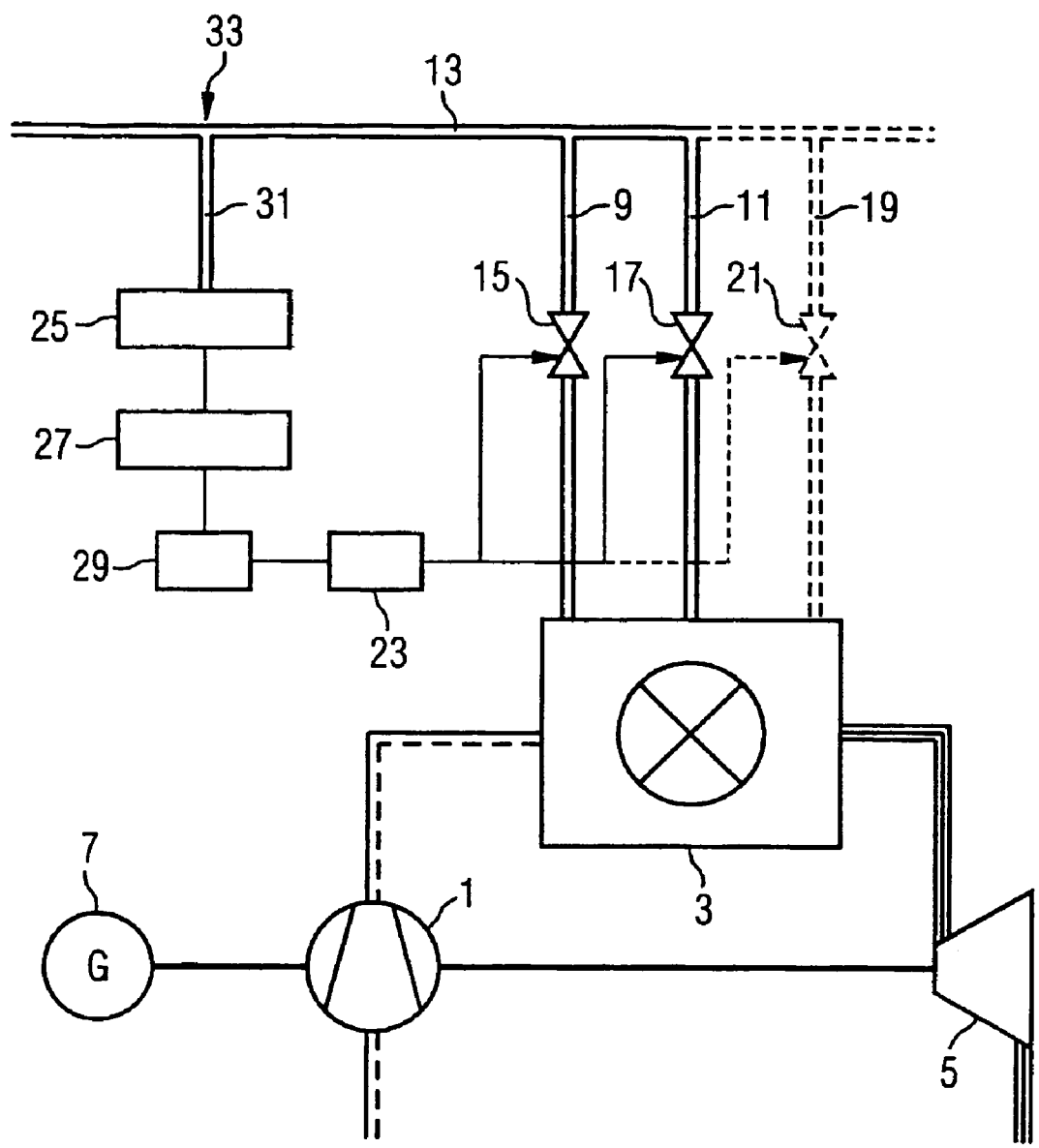
FIG. 1 shows an embodiment for the gas turbine system according to the invention in a schematic diagram.

FIG. 1, which comprises a schematic diagram for a circuit to update the characteristic values of the regulator, shows a gas turbine system with a compressor 1, a combustion chamber 3 and a turbine 5, which is connected to a generator 7.

A first fuel feed line 9 and a second fuel feed line 11 lead to the combustion chamber 3, said lines branching off from a fuel line 13 and are in each case equipped with a fuel control valve 15, 17. By means of the fuel feed lines 9, 11, a pilot burner and a main burner (both not shown) are supplied with fuel. In addition to the pilot burner and the main burner, which are usually to be operated in parallel, in particular additional burner stages to be operated in parallel can be available, as is shown in the drawing by means of an additional fuel feed line 19 and an additional fuel control valve 21.

In order to be able to compensate for variations in the fuel composition, the gas turbine system shown in the Figure also comprises a regulator 23 for adjusting the supply of fuel to the individual burner stages depending on the heat released in the combustion chamber 3. Said characteristic values of the regulator can for example be determined via the exhaust gas temperature or the efficiency of the turbine 5, as is generally known and will therefore not be explained further in this case. The regulator 23 contains characteristic values of the regulator, on the basis of which the fuel control valves 15, 17 are adjusted in the case of a change in the quantity of heat released in the combustion chamber 3.

The gas turbine system also comprises an analyzer 25 for analyzing the fuel composition of the fuel flowing through the fuel line 13, a computing unit 27 connected with the analyzer 25 for receiving the result of the analysis, said computing unit calculating the Wobbe index of the fuel on the basis of the result of the analysis and an updating unit 29 for updating the characteristic values of the regulator connected to both the computing unit 27 for receiving the Wobbe index and a regulator 23 for updating the characteristic values of the regulator.

Via a branch line 31 branching off from the fuel line 13, a small amount of the fuel flowing through the fuel line 13 is fed to the analyzer 25, so that it can be analyzed. The analyzer 25 forwards the result of the analysis to the computing unit 27, which calculates the Wobbe index of the analyzed fuel and outputs the Wobbe index determined in this way to the updating unit 29. Said unit updates by means of the received Wobbe index the characteristic values of the regulator for the fuel control valves 15, 17 in the control systems of the regulator 23. On the basis of the updated characteristic values of the regulator, the supply of fuel to the individual burner stages is then adjusted by means of the fuel control valves 15, 17. Adapting the characteristic values of the regulator to the current Wobbe index of the fuel in this case allows the supply of fuel to the individual burner stages to be adjusted in such a way that keeping the fuel split constant at the current target value or an adjustment of the fuel split to a suitable, new target value takes place.

In order to also be able to react to sudden changes in the fuel composition while keeping the fuel split constant at the target value or an adjustment of the fuel split to a new target value, the branch line 31 branches off at a branching point 33 of the fuel line 13, its distance from the fuel control valves 15, 17 is selected in such a way that the time which is required by the fuel flowing in the fuel line 13, in order to cover the path between the branching point 33 and the fuel control valves 15, 17, is long enough to enable the following steps to be carried out:
1. Routing the branched-off fuel to the analyzer.
2. Analyzing the fuel composition.
3. Calculating the Wobbe index of the fuel.
4. Updating the characteristic values of the regulator.
5. Adjusting the fuel control valves.

More particularly, the moment of adjusting the fuel control valves with due consideration to the rate of the fuel flow is in this case selected in such a way that the adjustment is always carried out accurately by means of the Wobbe index of the fuel, which has just arrived at the fuel control valves 15, 17.

In the given embodiment, the computing unit 27, the updating unit 29 and the regulator 23 are shown as individual units. As an alternative, the computing unit 27 and/or the updating unit 29 can also be integrated in the regulator 23.

The invention claimed is:

1. A gas turbine system comprising:
a control device for adjusting a fuel supply in a gas turbine system having a plurality of burner stages operated in parallel in which a plurality of fuel control valves are allocated to the burner stages and a regulator is allocated to the fuel control valves to compensate for variations in a fuel composition, the control device including an analyzer for analyzing the fuel composition, a computing unit for calculating a current Wobbe index of the fuel composition based on the analysis, and an updating unit for adjusting the regulator and the fuel control valves based on the calculated current Wobbe index to keep the fuel supply split between the burner stages at a constant target value;
a fuel line through which a fuel flows, including a branching point on the fuel line for branching off a part of the fuel and for introducing the branched off fuel into a branch line as an analysis sample flow; and
the analyzer positioned to receive the analysis sample flow, wherein a distance between the branching point and the fuel control valves is sufficiently elongated to allow:
the analyzer to fully analyze the fuel composition of the sample flow,
the computing unit to fully calculate the current Wobbe index, and
the updating unit to fully adjust the regulator and the fuel control valves before the fuel reaches the fuel control valves.

2. The control device as claimed in claim 1, wherein the computing unit is physically separated from the regulator.

3. The control device as claimed in claim 1, wherein the computing unit is integrated into the regulator.

4. The control device as claimed in claim 1, wherein the updating unit is physically separated from the regulator.

5. The control device as claimed in claim 1, wherein the updating unit is integrated into the regulator.

6. A gas turbine system, comprising:
a plurality of burner stages operated in parallel in which a plurality of fuel control valves are allocated to the burner stages and a regulator is allocated to the fuel control valves; and
a control device for adjusting a fuel supply in the gas turbine system to keep the fuel supply split between the burner stages at a constant target value to compensate for variations in a fuel composition, comprising:
an analyzer for analyzing the fuel composition,
a computing unit for calculating a current Wobbe index of the fuel composition based on the analysis, and
an updating unit for adjusting the regulator and the fuel control valves based on the calculated current Wobbe index, wherein the gas turbine system comprises:
a fuel line through which a fuel flows;
a branching point on the fuel line for branching off a part of the fuel and for introducing the branched off fuel as an analysis sample flow; and
a branch line which feeds the analysis sample flow to the analyzer of the control device,
wherein a distance between the branching point and the fuel control valves is sufficiently elongated to allow:
the analyzer to fully analyze the fuel composition of the sample flow,
the computing unit to fully calculate the current Wobbe index, and
the updating unit to fully adjust the regulator and the fuel control valves before the fuel reaches the fuel control valves.

7. The gas turbine system as claimed in claim 6, wherein the gas turbine system comprises a pilot burner stage and a main burner stage.

* * * * *